(12) United States Patent
Jinno

(10) Patent No.: US 9,152,895 B2
(45) Date of Patent: Oct. 6, 2015

(54) IMAGE PROCESSING APPARATUS, METHOD THEREOF, AND STORAGE MEDIUM

(71) Applicant: CANON KABUSHIKI KAISHA, Tokyo (JP)

(72) Inventor: Takayuki Jinno, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/271,892

(22) Filed: May 7, 2014

(65) Prior Publication Data

US 2014/0333970 A1  Nov. 13, 2014

(30) Foreign Application Priority Data

May 9, 2013  (JP) .................................. 2013-099447
Apr. 11, 2014  (JP) .................................. 2014-082022

(51) Int. Cl.
*G06K 15/02* (2006.01)
*G03G 15/00* (2006.01)
*H04N 1/40* (2006.01)

(52) U.S. Cl.
CPC ........ *G06K 15/1868* (2013.01); *G03G 15/6588* (2013.01); *G03G 2215/00751* (2013.01)

(58) Field of Classification Search
USPC ............... 358/3.24, 518, 526, 505, 504, 501; 382/108
See application file for complete search history.

(56) References Cited

U.S. PATENT DOCUMENTS

| 2003/0202214 A1* | 10/2003 | Akita et al. .................. 358/3.24 |
| 2010/0046035 A1* | 2/2010 | Kinoshita .................... 358/3.06 |
| 2013/0010339 A1* | 1/2013 | Yoshizawa .................... 358/505 |

FOREIGN PATENT DOCUMENTS

| JP | 11271037 A * | 10/1999 |
| JP | P2011-257727 A | 12/2011 |

* cited by examiner

*Primary Examiner* — Quang N Vo
(74) *Attorney, Agent, or Firm* — Canon U.S.A., Inc. IP Division

(57) ABSTRACT

An image processing apparatus that outputs, in the recording of a fine line image, an image having high fine line reproducibility by performing image processing according to a paper frequency characteristic. This image processing apparatus includes an input unit configured to input image data representing an image to be formed on a recording medium, an acquisition unit configured to acquire a frequency characteristic of surface unevenness of the recording medium, and a correction unit configured to correct the image data based on the frequency characteristic acquired by the acquisition unit.

14 Claims, 19 Drawing Sheets

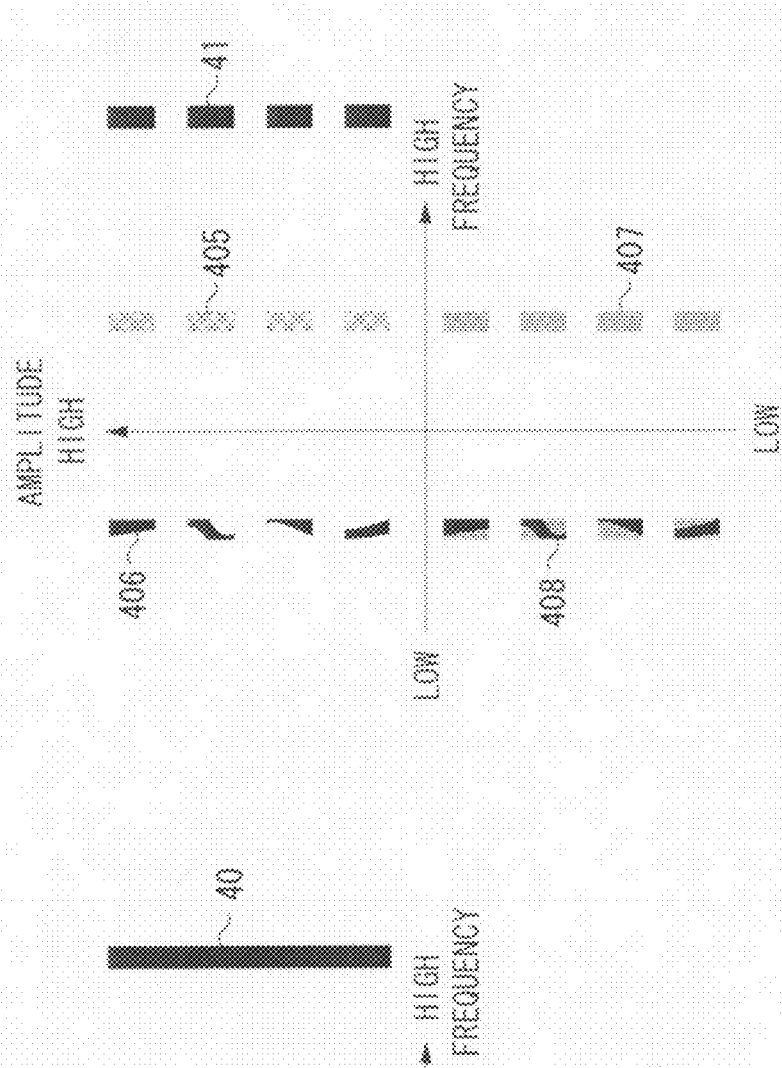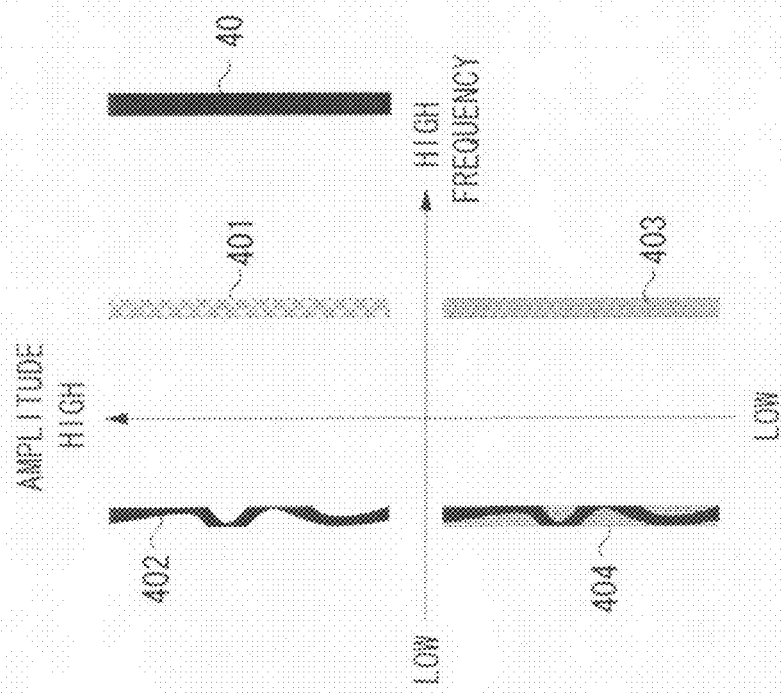

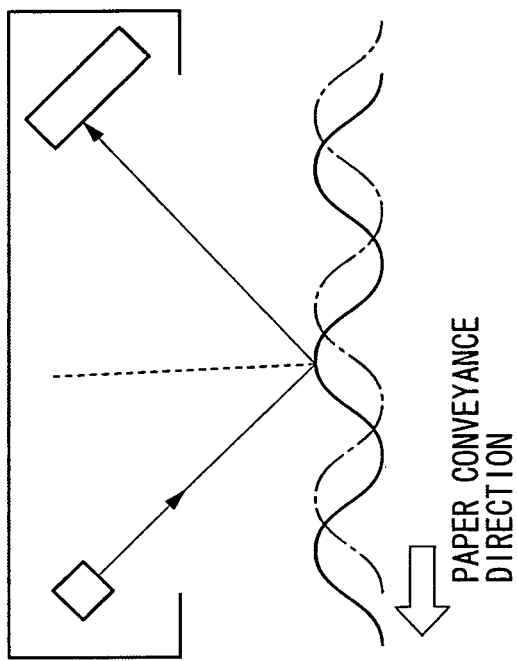
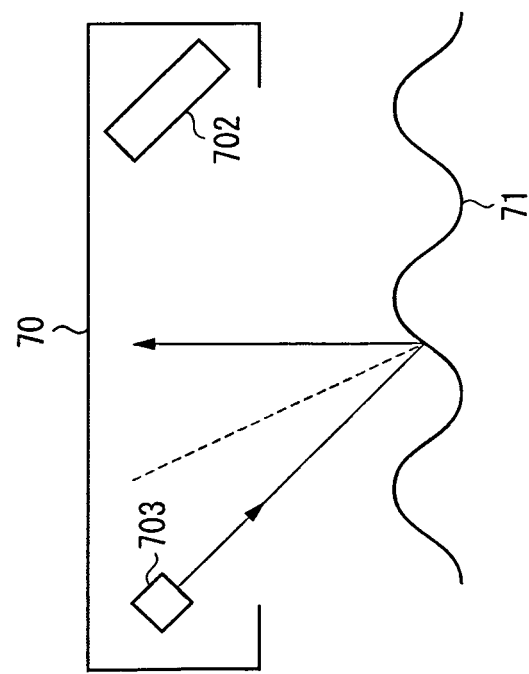
FIG. 7A
FIG. 7B

FIG. 11A
FIG. 11B
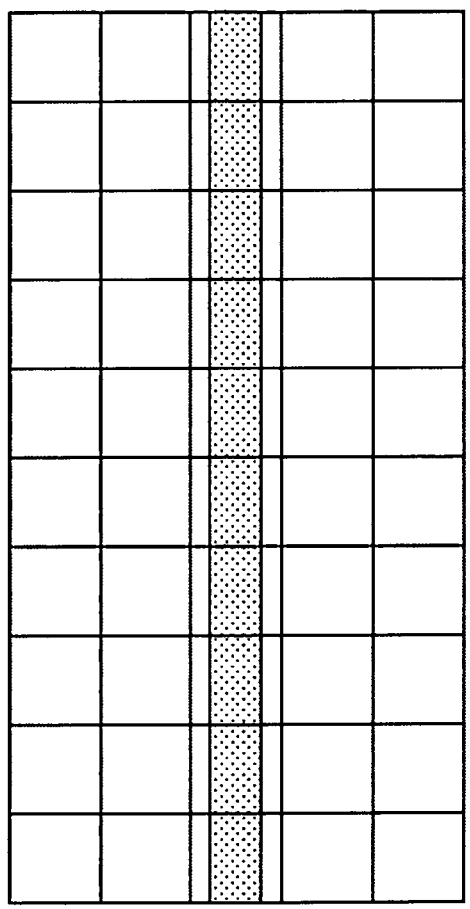
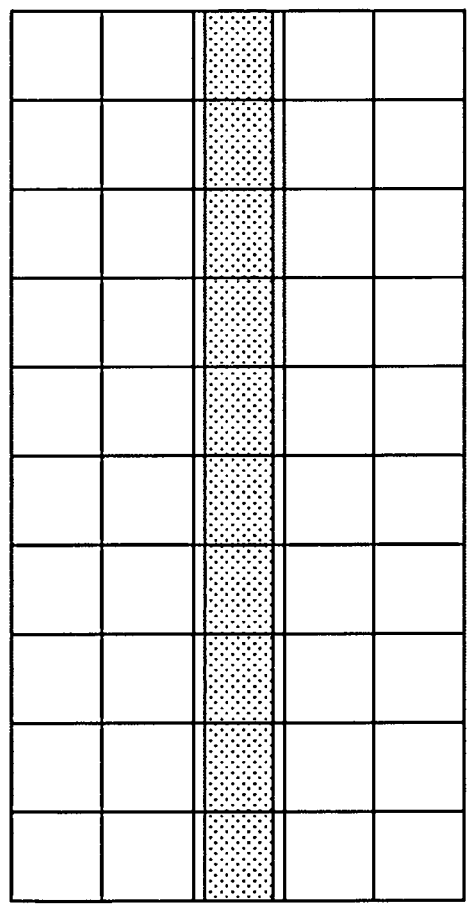

IMAGE PROCESSING APPARATUS, METHOD THEREOF, AND STORAGE MEDIUM

BACKGROUND OF THE INVENTION

1. Field of the Invention

The present invention relates to an image processing apparatus that processes image data representing an image to be formed on a recording medium, and a method thereof.

2. Description of the Related Art

An electrophotographic type image forming apparatus is an example of an apparatus that forms an image on a recording medium. In electrophotography, first, a charging unit uniformly charges a photosensitive member, which is an image bearing member. Then, an exposure unit scans the photosensitive member with an optical beam such as a laser according to an image signal to form an electrostatic latent image on the photosensitive member. Next, a developing unit develops the electrostatic latent image formed on the photosensitive member to form a toner image thereon. Then, generally, the toner image developed on the photosensitive member is primarily transferred onto an intermediate transfer member, and then secondarily transferred from the intermediate transfer member onto a recording medium. A fixing unit fixes toner on the recording medium by heating and pressing the transferred toner image to form an image on the recording medium.

Recently, various types of recording media are used in electrophotographic type image forming apparatuses, and depending on the type of recording medium, it is known that defects can occur during the transfer step or the fixing step. It is known that, especially in the case of drawing a fine line of about several tens micrometers to several hundred micrometers width, which is used in drawings and letters, on recording media having large surface unevenness, discontinuity or irregularity of lines, or a recording density decrease may be caused.

Japanese Patent Application Laid-Open No. 2011-257727 discusses a technique for controlling at least one of halftone processing, exposure intensity, and developing bias based on the unevenness state of the paper surface. For example, if the paper surface unevenness is large, in consideration of a decrease in the toner transfer amount (a transfer defect) at depressed portions, the dot size is relatively increased at depressed portions compared with that for paper having a flat surface.

However, for a fibrous recording medium like paper, the frequency characteristic of the surface unevenness is different depending on the thickness of the fibers, and fine line reproducibility also changes. In the method discussed in Japanese Patent Application Laid-Open No. 2011-257727, while control is performed in consideration of the surface unevenness of the recording medium, consideration is not given to the frequency characteristic of the recording medium. Therefore, the appropriate fine line processing is not always performed.

SUMMARY OF THE INVENTION

The present invention is directed to an image processing apparatus capable of, in the recording of a fine line image, outputting an image having high fine line reproducibility by performing image processing according to a paper frequency characteristic.

According to an aspect of the present invention, an image processing apparatus includes an input unit configured to input image data representing an image to be formed on a recording medium, an acquisition unit configured to acquire a frequency characteristic of surface unevenness of the recording medium, and a correction unit configured to correct the image data based on the frequency characteristic acquired by the acquisition unit.

According to exemplary embodiments of the present invention, in the recording of a fine line image, an image having high fine line reproducibility can be output by performing image processing according to a paper frequency characteristic.

Further features of the present invention will become apparent from the following description of exemplary embodiments with reference to the attached drawings.

BRIEF DESCRIPTION OF THE DRAWINGS

FIGS. 4A and 4B are schematic diagrams illustrating reproducibility of a fine line image.

FIGS. 7A and 7B are schematic diagrams illustrating an example of a method for measuring paper surface unevenness using an unevenness sensor unit.

FIGS. 11A and 11B are schematic diagrams illustrating exposure signal data.

DESCRIPTION OF THE EMBODIMENTS

Figure 5:
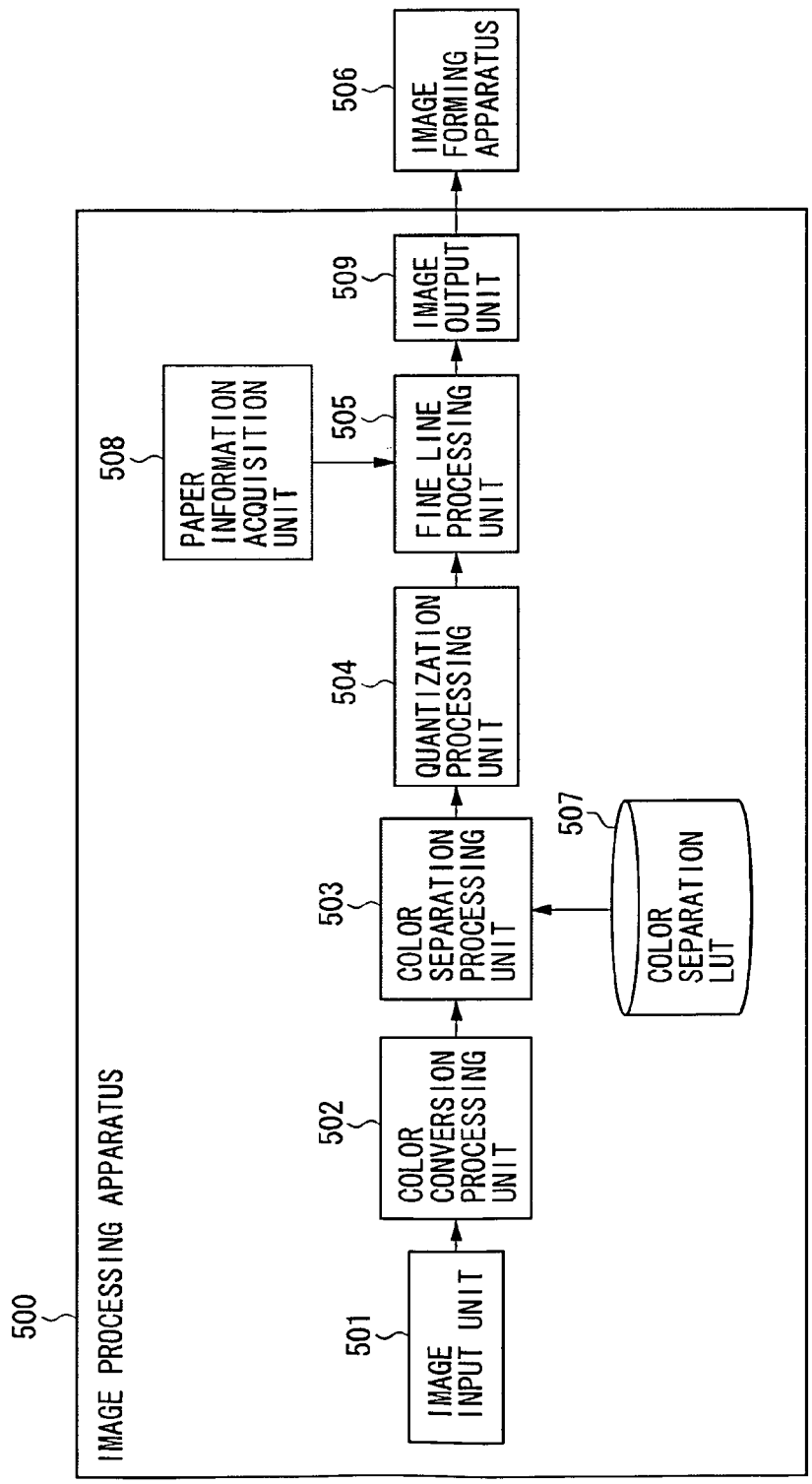
FIG. 5 is a block diagram illustrating a configuration of an image processing apparatus.

FIG. 5 is a block diagram illustrating a configuration of an image forming system to which a first exemplary embodiment can be applied. An image forming system according to the present exemplary embodiment includes an image forming apparatus 506 that forms an image on a recording medium using an electrophotographic method, and an image processing apparatus 500 that converts input image data into image data that can be output by the image forming apparatus 506. The image processing apparatus 500 and the image forming apparatus 506 are connected by a wireless communication interface or the like, or a circuit. The image processing apparatus 500 is, for example, a printer driver that is installed in a typical personal computer. In such a case, each unit in the image processing apparatus 500, which will be described below, is realized by the computer executing a predetermined program. However, the image forming apparatus 506 may also be configured to include the image processing apparatus 500.

[Image Processing Apparatus]

The image processing apparatus 500 includes an image input unit 501, a color conversion processing unit 502, a color separation processing unit 503, a quantization processing unit 504, a fine line processing unit 505, a paper information acquisition unit 508, and an image output unit 509.

Input image data to be printed by the image forming apparatus 506 is input via the image input unit 501. For example, digital input image data consisting of red (R), green (G), and blue (B) is input.

The color conversion processing unit 502 maps an image signal of the input image to a device-independent color space (e.g., commission internationale de l'éclairage (CIE) L*a*b* color space or CIE XYZ color space). Generally, the color gamut reproducible by the image forming apparatus 506, such as a printer, is narrower than the color gamut of digital image data. Therefore, the color conversion processing unit 502 performs color conversion for compressing the color or the input image data into a color gamut reproducible by the image forming apparatus 506. This color conversion processing is performed based on a lookup table (LUT) where the correspondence between L*a*b* values and RGB values is described. However, the color conversion processing is not limited thereto, and may also be performed by a matrix calculation.

The color separation processing unit 503 converts device-independent color space values output by the color conversion processing unit 502 into a signal value of each color material mounted on the image forming apparatus 506. For example, if the image forming apparatus 506 has cyan (C), magenta (M), yellow (Y), and black (K) color materials, the color separation processing unit 503 converts L*a*b* values into the respective CMYK signal values by referring to a color separation LUT 507 where the correspondence between L*a*b* values and CMYK values is described, and outputs color-separated image data corresponding to each color. The obtained color-separated image data of each color is, for example, 8-bit (256 tones) image data.

The quantization processing unit 504 performs quantization processing on the color-separated image data of each color output from the color separation processing unit 503. In the present exemplary embodiment, the quantization processing unit 504 converts 8-bit (256 tones) color-separated image data into 4-bit (17 tones including 0 to 16 pixel values) quantized image data for each pixel.

The fine line processing unit 505 acquires from the paper information acquisition unit 508 paper information indicating a frequency characteristic of paper to be output by the image forming apparatus 506, and performs fine line processing on the quantized image data of each color based on the frequency characteristic of the paper to be output. Fine line processing means correcting the pixel value of fine line pixels forming a fine line, or those of pixels near the fine line pixels, in the quantized image data. The processing performed by the fine line processing unit 505 will be described in more detail below.

The image output unit 509 converts the image data of each color output from the fine line processing unit 505 into exposure signal data for controlling an exposure unit in the image forming apparatus 506. In the present exemplary embodiment, the image output unit 509 performs pulse-width modulation (also referred to as PWM processing) to translate image data including multiple tones into an exposure scanning length.

Figure 16:
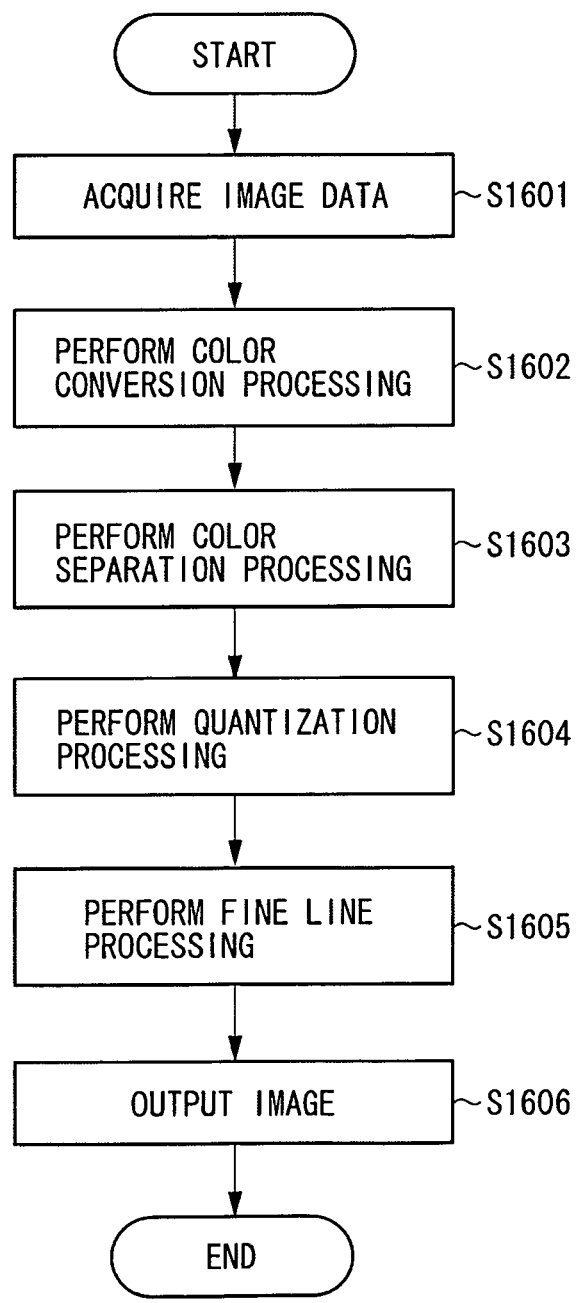
FIG. 16 is a flowchart illustrating a flow of processing performed in an image processing apparatus.

FIG. 16 is a flowchart illustrating a flow of processing performed in an image forming system to which the present exemplary embodiment can be applied. First, in step S1601, the image input unit 501 acquires image data, and stores the image data in a memory region secured according to the image data size. Next, in step S1602, the color conversion processing unit 502 maps an image signal of the input image acquired in step S1601 to a device-independent color space, and updates the data in the memory region. In step S1603, the color separation processing unit 503 converts the device-independent data converted in step S1602 into a signal value corresponding to the recorded amount of each color material, and updates the data in the memory region. In addition, in step S1604, the quantization processing unit 504 performs quantization processing on the signal value of each color material subjected to the color separation processing in step S1603, and updates the data in the memory region. In step S1605, the fine line processing unit 505 performs the above-described fine line processing on the quantized data, and updates the data in the memory region. Lastly, in step S1606, the image output unit 509 performs PWM processing on the data subjected to the fine line processing, and transmits the resultant data to the image forming apparatus 506. Although an example has been described here in which the memory content is updated at each step, the data may also be stored in a different memory region secured for each processing step.

[Image Forming Apparatus]

Figure 6:
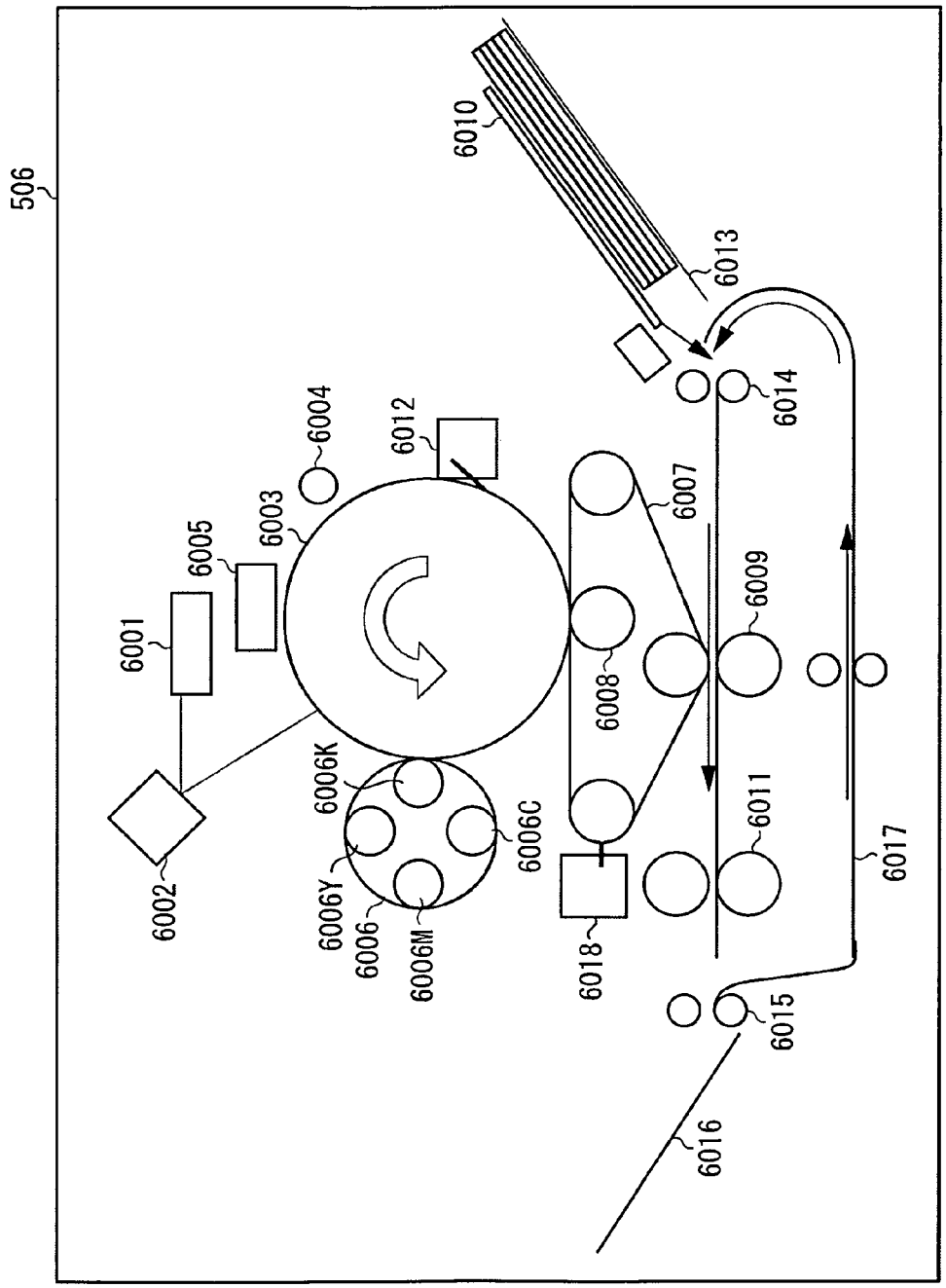
FIG. 6 illustrates a configuration example of a single drum electrophotographic recording type image forming apparatus.

FIG. 6 is a block diagram illustrating a configuration of the electrophotographic image forming apparatus 506 to which the present exemplary embodiment can be applied. The image forming apparatus 506 includes a laser diode 6001 and a polygon mirror 6002, which are an exposure unit, a photosensitive drum 6003, which is an image bearing member, a static eliminator 6004, a charging device 6005, and a developing unit 6006. The image forming apparatus 506 further includes a primary transfer device 6008, an intermediate transfer belt 6007, registration rollers 6014, and a secondary transfer device 6009, which perform a transfer process. A fixing process is performed by a fixing device 6011. A photosensitive drum cleaner 6012 and an intermediate transfer belt cleaner 6018 remove residual toner on the photosensitive drum 6003 and the intermediate transfer belt 6007, respectively. In the case of a single drum as illustrated in FIG. 6, developing units corresponding to a plurality of colors share the laser diode, the polygon mirror, the photosensitive drum, the charging device, the primary transfer device, and the photosensitive drum cleaner. The process in which an image is output by the image forming apparatus 506 will be described below.

After static electricity has been uniformly removed from the photosensitive drum 6003 by the static eliminator 6004, the photosensitive drum 6003 is uniformly charged by the charging device 6005. The laser diode 6001 generates laser light based on exposure signal data determined by the image processing apparatus 500. The laser light passes through the polygon mirror 6002 and an fθ lens (not illustrated), and the photosensitive drum 6003 rotating in the direction of an arrow in FIG. 6 is exposure-scanned with the laser light. Consequently, an electrostatic latent image is formed on the photosensitive drum 6003. Then, the electrostatic latent image is developed as a toner image by toner supplied from the developing unit 6006. The developed toner image is transferred by the primary transfer device 6008 onto the intermediate transfer belt 6007, which is stretched around a plurality of rollers and driven endlessly.

This operation is repeated while switching the developing unit for each color (cyan 6006C, magenta 6006M, yellow 6006Y, and black 6006K), to form a toner image including a plurality of colors that have been sequentially transferred onto the intermediate transfer belt 6007.

Meanwhile, a recording medium 6010 is conveyed from a paper feed tray 6013 to the registration rollers 6014, and then conveyed by the registration rollers 6014 to the secondary transfer device 6009. Then, the color toner image transferred onto the intermediate transfer belt 6007 is transferred onto the recording medium 6010 that has been conveyed by the secondary transfer device 6009. The fixing device 6011 fixes the toner image on the recording medium 6010. The recording medium 6010 on which the image has been formed is then discharged onto a discharge tray 6016 by discharge rollers 6015.

Residual toner remaining on the photosensitive drum 6003 is wiped off by the photosensitive drum cleaner 6012 and collected. Further, residual toner on the intermediate transfer belt 6007 that remains after the recording medium 6010 has been separated therefrom is wiped off by the intermediate transfer belt cleaner 6018, such as a blade.

In the present exemplary embodiment, an example of a single drum electrophotographic image forming apparatus 506 has been described. However, a tandem type electrophotographic method having a mechanism for each of the plurality of color developing units may also be employed.

The paper frequency characteristic and fine line image reproducibility will now be described.

Figure 1A:
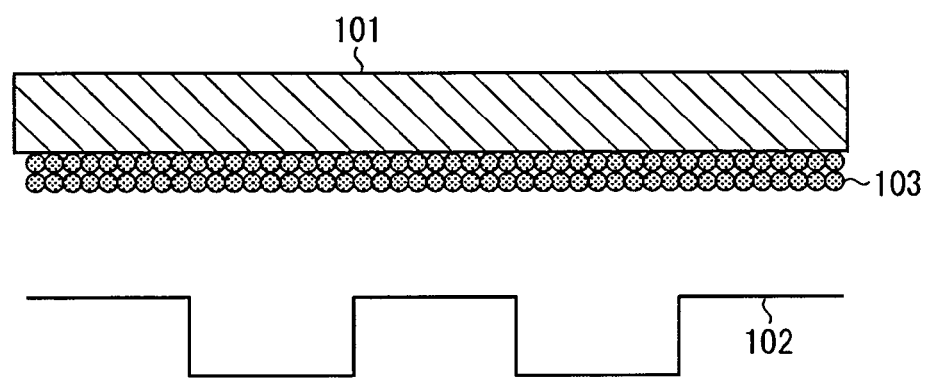
FIGS. 1A and 1B are schematic diagrams illustrating toner movement from an intermediate transfer member onto paper before and after transfer, seen from a cross-sectional direction.
Figure 1B:
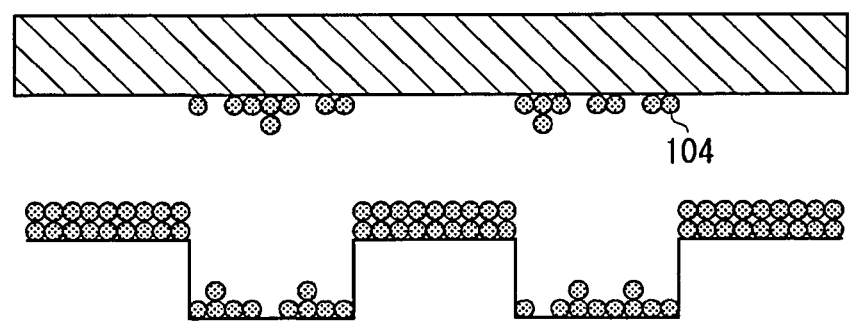

First, there are various causes for transfer defects that lead to deterioration in the reproducibility of a fine line image. Examples of such causes include an air gap between transfer paper and toner on an intermediate transfer member. FIGS. 1A and 1B are schematic diagrams illustrating toner movement from an intermediate transfer member onto paper before and after transfer, seen from a cross-sectional direction. FIG. 1A illustrates toner movement before transfer and FIG. 1B illustrates toner movement after transfer. Toner 103 on an intermediate transfer member 101 is transferred onto paper 102. Although not illustrated in the diagrams, if the paper is a flat sheet with little unevenness on the surface, the air gap is substantially the same level regardless of location, so that the toner layer is uniformly transferred onto the paper. However, for paper having large surface unevenness (surface roughness) like that illustrated in FIG. 1, since the air gap widens at depressed portions of the paper, and the transfer electric field weakens, toner is not sufficiently transferred to the depressed portions, and residual toner 104 remains on the intermediate transfer belt member 101.

Figure 2A:
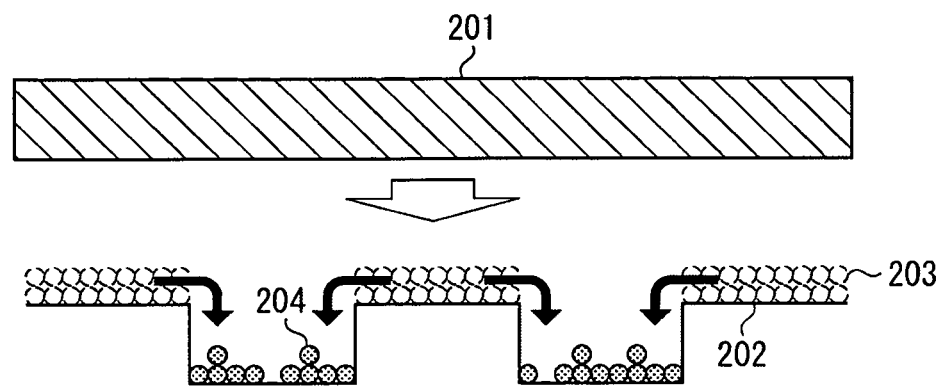
FIGS. 2A and 2B are schematic diagrams illustrating toner deformation on paper during a fixing process, seen from a cross-sectional direction.
Figure 2B:
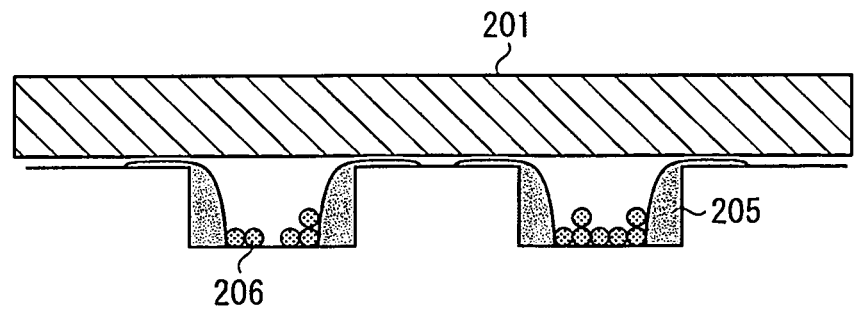

There are various causes for fixing defects, as well, that lead to deterioration in the reproducibility of a fine line image. Next, a fixing defect caused by paper surface unevenness will be described. FIGS. 2A and 2B are schematic diagrams illustrating toner deformation on paper during a fixing process, seen from a cross-sectional direction. FIG. 2A illustrates behavior at a fixing nip, and FIG. 2B illustrates the toner deformation after fixing. A fixing member 201 fixes toner on paper 202 by heating and pressurizing. Although not illustrated in the diagrams, if the paper is a flat sheet with little unevenness on the surface, since the amount of pressure exerted on the toner and the amount of heat applied thereon are almost the same regardless of location, the toner layer is uniformly fixed on the paper. However, for paper having large surface unevenness like that illustrated in FIGS. 2A and 2B, during the process in which the toner at the fixing nip is heated and pressurized so that the toner is melted and fixed onto the paper, toner 203 at a raised portion is wiped in the direction toward a depressed portion by pressure from the fixing member 201 as illustrated by arrows in FIG. 2A. Further, since toner 204 at a depressed portion is not in contact with the fixing member 201, the toner 204 is not sufficiently melted or pressed. FIG. 2B illustrates toner 205 wiped in the direction toward the depressed portion, and toner 206 remaining on the paper 202 with its particle shape almost being unchanged because the toner 206 is not sufficiently melted. Consequently, toner depletion occurs at raised portions, while at depressed portions gaps are created among the toner particles due to the toner not being sufficiently pressed and spread out. As a result, a phenomenon occurs in which the paper surface is not sufficiently coated.

Figure 3C:
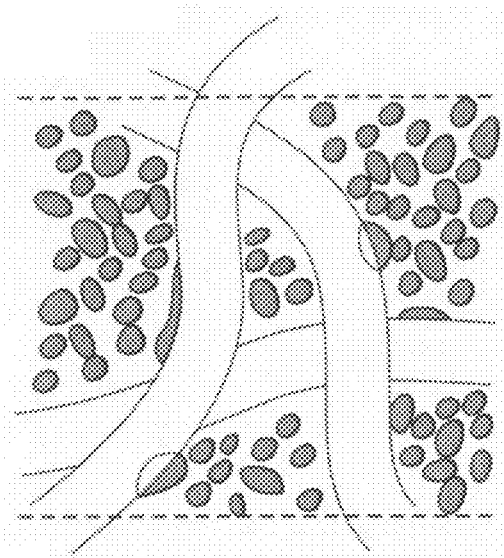
FIGS. 3A, 3B, and 3C are schematic diagrams illustrating enlarged observations of a sample on which fine lines are printed.
Figure 3B:
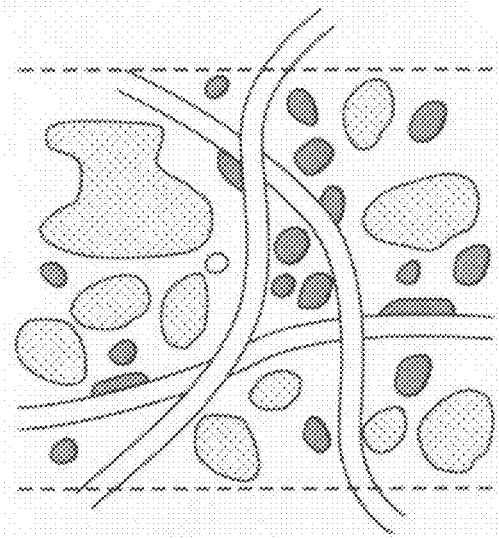
Figure 3A:
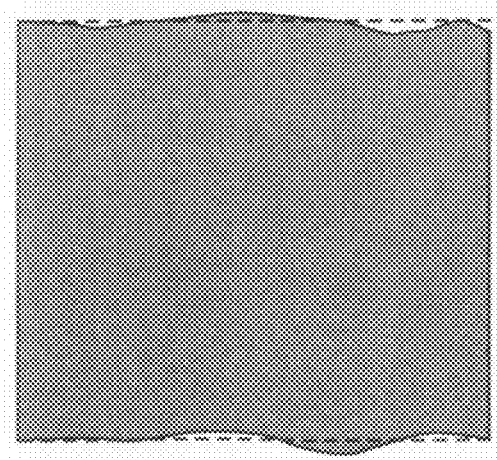

Thus, if paper surface unevenness is large, a transfer defect or a fixing defect can occur, causing fine line reproducibility to deteriorate. In addition, fine line reproducibility also differs depending on the thinness of the paper fibers. FIGS. 3A, 3B, and 3C are schematic diagrams illustrating enlarged observations of a sample taken with an optical microscope. FIG. 3A is a schematic diagram illustrating a case where a fine line image is printed on smooth paper having little surface unevenness. FIG. 3B is a schematic diagram illustrating a case where a fine line image is printed on paper having thin fibers. FIG. 3C is a schematic diagram illustrating a case where a fine line image is printed on paper having thick fibers. Generally, as a frequency characteristic of paper surface unevenness, paper having thin fibers tends to have a large high-frequency component and a low amplitude, and paper having thick fibers tends to have a large low-frequency component and a high amplitude. The inner side of the dotted lines is the region where the fine line should be formed. In FIG. 3A, in which smooth paper is used, it can be seen that a fine line is formed in a sufficient toner amount in the region where the fine line should be formed. In FIGS. 3B and 3C, in which paper having surface unevenness is used, the toner amount that is transferred onto the paper during the transfer process is less than that for smooth paper, as described above. Further, the toner on the fibers is wiped into the portions between the fibers during the fixing process, and the toner in the portions between the fibers is not sufficiently melted or pressed. In FIG. 3B, since raised portions where toner depletion occurs are present at a high frequency and the amplitude of unevenness is low, the fixing member is in contact with the toner, so that the toner is thinly pressed and spread out. In FIG. 3C, since raised portions where toner depletion occurs are present at a low frequency and the amplitude of unevenness is high, the fixing member is not in contact with the toner, so that the toner is not sufficiently pressed and spread out. As stated above, generally, although paper surface unevenness tends to have a low frequency and a high amplitude, or a high frequency and a low amplitude, according to the thickness of the fibers, depending on the type of paper, this is not always the case. Some types of paper have surface unevenness with a variety of frequency characteristics.

FIGS. 4A and 4B are pattern diagrams illustrating fine line reproducibility that differs depending on the frequency characteristic of paper. FIG. 4A illustrates an example in which an image 40 is input with its input signal including 100% fine line pixels, and FIG. 4B illustrates an example in which a halftone image 41 is input with its input signal including 60% fine line pixels. Images 401 and 405 are examples of high frequency and high amplitude paper, images 402 and 406 are examples of low frequency and high amplitude paper, images 403 and 407 are examples of high frequency and low amplitude paper, and images 404 and 408 are examples of low frequency and low amplitude paper.

The schematic diagram of FIG. 3B, in which a fine line image is output on paper having a high frequency and a low amplitude frequency characteristic, illustrates the fine line image 403, which is a fine line with a lower density than the image 40. Image 401 illustrates the case for paper having about the same level of high-frequency surface unevenness as that of the image 403 but having a higher amplitude than the image 403. If an image including a fine line is output on paper having about the same level of high frequency but a higher amplitude frequency characteristic, density further decreases, and fine line reproducibility further deteriorates. In addition, the schematic diagram of FIG. 3C, in which a fine line image is output on paper having a low frequency and a high amplitude frequency characteristic, illustrates the image 402, which is a fine line having undulations and thinner than the image 40. Image 404 illustrates the case for paper having about the same level of low-frequency surface unevenness as that of the image 402 but having a lower amplitude than the image 402. For paper whose surface unevenness has about the same low frequency but a lower amplitude, since the density is greater than the image 402, deterioration in fine line reproducibility due to undulations is suppressed. For paper having an amplitude component of a predetermined level or greater, the density of the fine line image weakens. Further, for paper whose surface unevenness has a low-frequency frequency characteristic, the fine line exhibit fine undulations. For paper whose surface unevenness has a high-frequency frequency characteristic, the fine line has a low density. In addition, the thinness of the line and the level of density decrease differ depending on the amplitude of the surface unevenness. Thus, it can be seen that fine line reproducibility differs depending on the frequency characteristic that the paper surface unevenness has.

[Paper Information Acquisition Unit Details]

Figure 8:
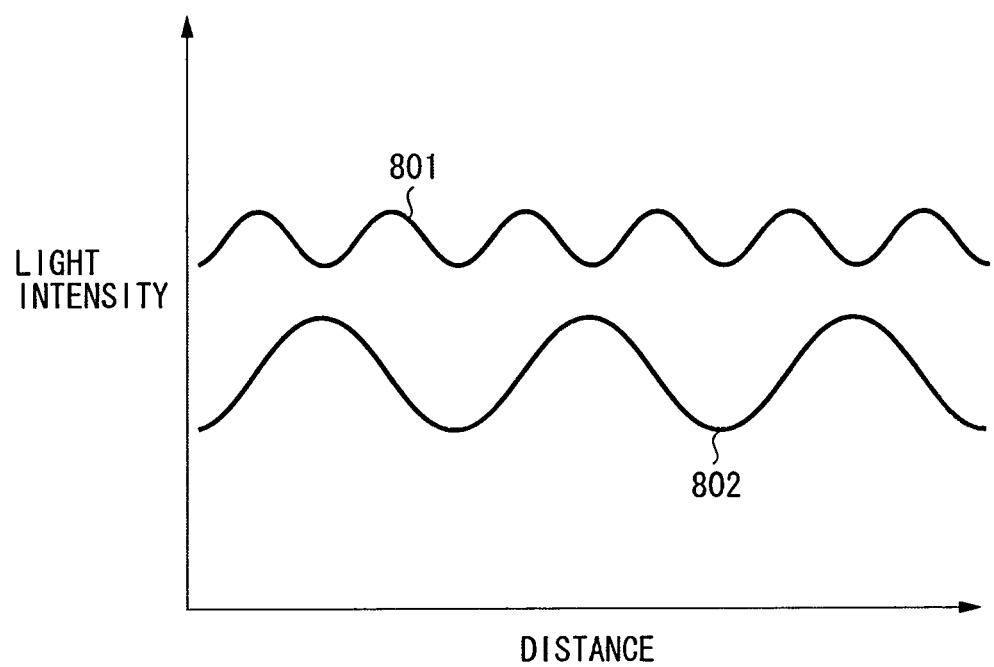
FIG. 8 is a graph illustrating an example of light intensity received by the unevenness sensor illustrated in FIGS. 7A and 7B.

The paper information, which indicates the frequency characteristic of the paper to be output by the image forming apparatus 506, and is to be acquired by the paper information acquisition unit 508, will now be described. FIGS. 7A and 7B are schematic diagrams illustrating an unevenness sensor unit, which is an example of a method for measuring paper surface unevenness. An unevenness sensor unit 70 measures surface unevenness information about a target sheet of paper 71. The unevenness sensor unit 70 includes a light source unit 703 and a light receiving unit 702. It is desirable for the light source 703 to have a configuration that emits a light beam having a small spot diameter like the laser light used in the image forming apparatus 506. Further, since the intensity of surface reflected light from uncoated paper, whose surface is not coated, is low, it is desirable that the light receiving unit 702 is a light receiving element having a high light sensitivity. The dotted lines in FIGS. 7A and 7B represent the normal direction of the region in the paper irradiated with light. The arrows indicate the progress direction of the light beam emitted from the light source unit 703. As can be understood from the diagrams, in the state of FIG. 7A, the surface reflected light is reflected in a different direction from the direction toward the light receiving unit 702. When paper is conveyed (or the unevenness sensor unit 70 is moved) from the state illustrated in FIG. 7A, and transitions to the state illustrated in FIG. 7B, the surface reflected light is received by the light receiving unit 702. FIG. 8 is a graph illustrating an example of the intensity of surface reflected light received by the light receiving unit 702 in the unevenness sensor unit 70 illustrated in FIGS. 7A and 7B. Measurement result 801 indicates the result of measuring paper whose surface unevenness has a high frequency and a low amplitude frequency characteristic. Measurement result 802 indicates the result of measuring paper whose surface unevenness has a low frequency and a high amplitude frequency characteristic. It can be seen that the higher the frequency of the paper surface unevenness, the shorter the light intensity change cycle, and the greater the amplitude, the greater the amplitude of the change in intensity of the surface reflected light. Performing frequency analysis of this change in the intensity of the surface reflected light allows the frequency characteristic of the paper surface unevenness to be obtained in an indirect manner. Since the absolute value of the intensity of the surface reflected light depends on the reflectance of the paper, the direct current component is excluded during frequency analysis. Further, the unevenness sensor unit 70 may be provided inside the image forming apparatus 506 and the paper may be sensed by the sensor unit by passing the paper therethrough, or the unevenness sensor unit 70 may be provided separately from the image forming apparatus 506 and the sensor unit side may be moved.

The method for acquiring the paper unevenness information is not limited to the method described above. For example, the paper unevenness information can be acquired by irradiating the paper with a surface-emitting type light source, and capturing an image with a two-dimensional sensor. Obviously, a well-known surface profile measurement device may be used, such as a laser microscope, an optical interferometry type surface profile measurement device, atomic force microscopy (AFM), and a three-dimensional digitizer. In addition, unevenness information about selectable paper may be added to the image processing apparatus 500, and surface unevenness information about the paper may be automatically acquired according to the selected paper. As another method, surface unevenness information about the paper may be input by the user.

[Fine Line Processing Unit Details]

Figure 9:
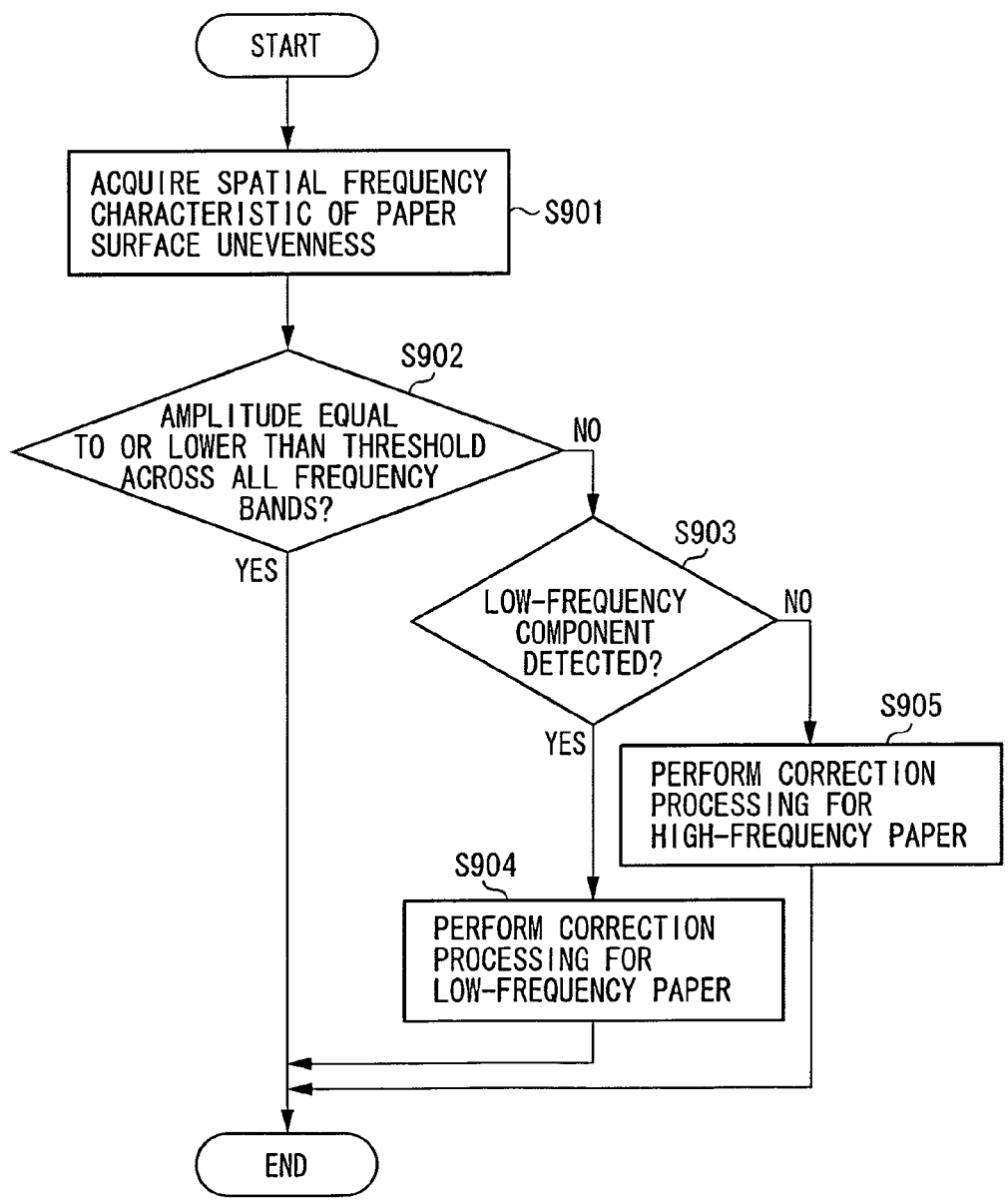
FIG. 9 is a flowchart illustrating a flow of processing for determining a fine line processing method.

The correction processing performed by the fine line processing unit 505 according to the paper frequency characteristic will now be described in more detail. As described above, the printing result of a fine line differs depending on the frequency characteristic of the paper surface unevenness. If the paper surface unevenness has a low frequency, the fine line tends to be thinner than intended, while if the paper surface unevenness has a high frequency, the line density tends to be weaker than intended. Accordingly, in order to output a high-quality fine line image, correction processing is performed according to the frequency characteristic of the paper surface unevenness. FIG. 9 is a flowchart illustrating a flow of processing for determining the fine line correction method.

First, in step S901, the frequency characteristic of the surface unevenness of paper to be output is acquired utilizing the above-described method. Based on the result measured by the sensor unit 70, information indicating the amplitude and the frequency of the paper surface unevenness is acquired. Next, in step S902, it is determined whether the amplitude is equal to or less than a predetermined threshold at all target frequencies, namely, whether surface roughness is equal to or less than a predetermined value. If it is determined in step S902 that the amplitude for the paper to be output is equal to or less than the predetermined threshold at all frequencies, namely, that the paper has a smooth surface (YES in step S902), since there is no need to perform correction processing, correction processing is completed. On the other hand, if it is determined in step S902 that the amplitude is greater than the predetermined threshold at any one of the frequencies, namely, that paper having a rough surface is used (NO in step S902), there is a need to perform correction processing. The threshold used in step S902 does not have to be a fixed value for all frequencies, a different threshold may be set for respective frequency bands. If it is determined in step S902 that there is a need to perform correction processing (NO in step S902), the processing proceeds to step S903.

In step S903, it is determined whether an amplitude component higher than a predetermined threshold is present in a frequency band that is lower than a predetermined frequency set in advance. If it is determined in step S903 that a high amplitude component is present in the low-frequency band (YES in step S903), the processing proceeds to step S904, and correction processing for low-frequency paper is executed. On the other hand, if it is determined in step S903 that a high amplitude component is not present in the low frequency band, namely, that a high-frequency amplitude component is present on the high-frequency band side (NO in step S903), the processing proceeds to step S905, and correction processing for high-frequency paper is executed.

The processing performed in step S904 will now be described with reference to FIGS. 10 to 13. As described above, if the paper surface unevenness has a low frequency, and if printing is performed under the same conditions as those for smooth paper, a thinner line than that originally intended for the fine line image is printed. Accordingly, the pixel values are changed in the exposure signal data generated based on image data quantized by the quantization processing unit 504 so that the fine line is thicker. In other words, the fine line processing unit 505 changes the pixel values so that the exposure width indicated by the exposure signal data is thicker. However, the fine line processing unit 505 does not perform processing on pixels with a pixel value of 0.

Figure 10:
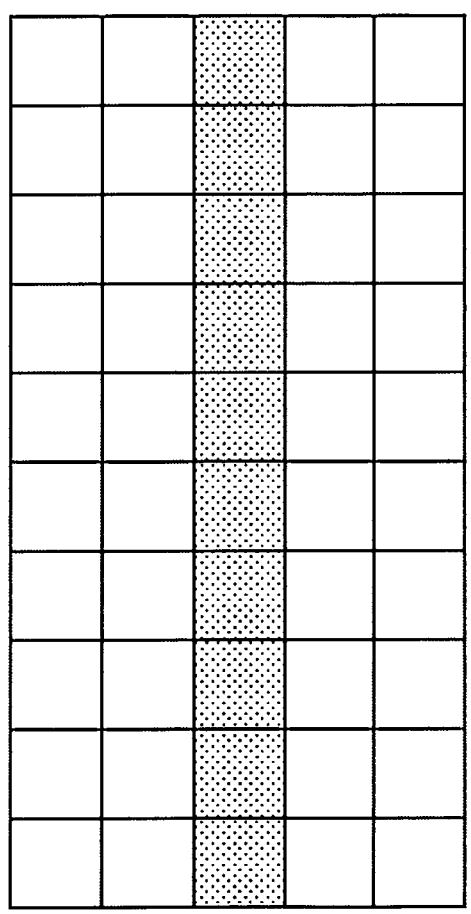
FIG. 10 illustrates an example of quantized image data.
Figure 12:
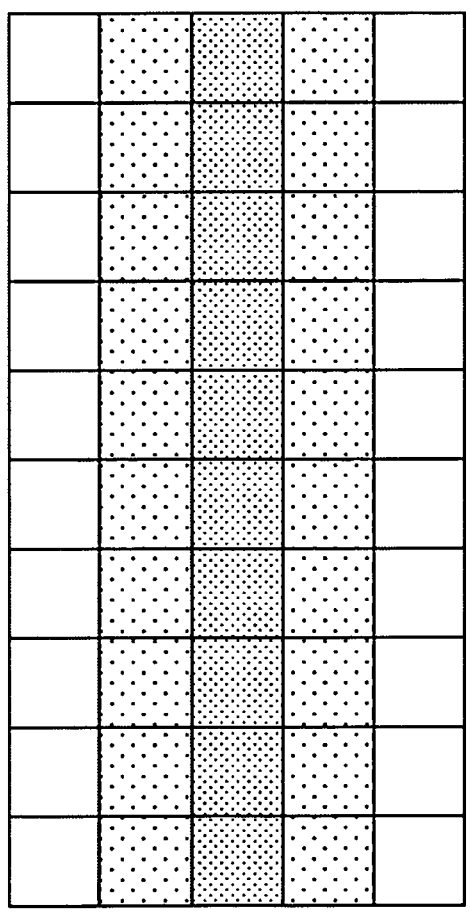
FIG. 12 illustrates an example of quantized image data.
Figure 13:
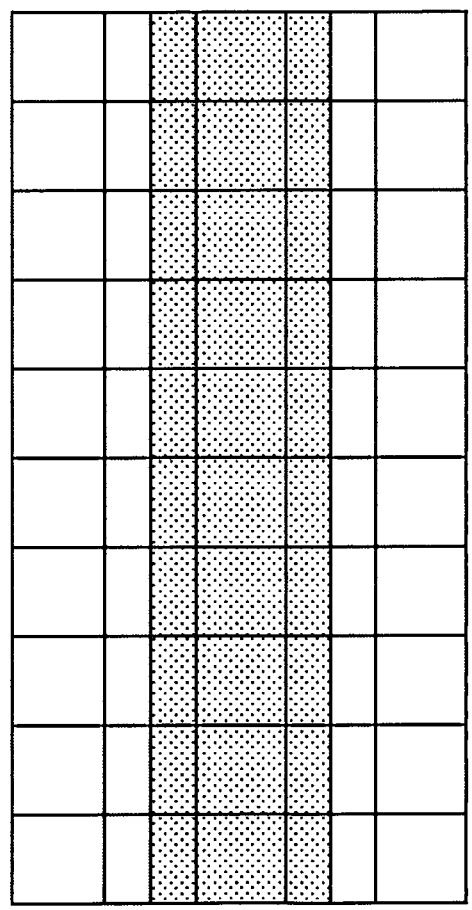
FIG. 13 is a schematic diagram illustrating exposure signal data.

FIG. 10 illustrates an example of quantized image data obtained from quantization processing performed by the quantization processing unit 504 on an image including a fine line pixel. The image forming apparatus 506 can output the respective pixels (a lattice) of the quantized image data illustrated in FIG. 10 in 16 levels according to their pixel values. In the quantized image data, the hatched region represents fine line pixels forming a fine line. FIG. 10 illustrates a case where each of the fine line pixels has a pixel value of 8, and the other pixels have a pixel value of 0. FIGS. 11A and 11B illustrate examples of exposure signal data obtained by performing PWM processing on the image data illustrated in FIG. 10. FIG. 11A illustrates exposure signal data in a case of smooth paper where it is determined in step S902 that there is no need to perform correction processing. For this exposure signal data, 50% of the width of each pixel is exposed in a main scanning direction of laser light (the horizontal direction in the diagram). FIG. 11B illustrates exposure signal data in a case where the correction processing for low-frequency paper is performed in step S904, resulting in 80% of the width of each pixel being exposed. Since the exposure is performed lengthwise in the main scanning direction, in the latent image and the developed image, the fine line is thicker than the input fine line image. However, as described above, since the line becomes thinner in the transfer process and the fixing process, a line having the same thickness as the input fine line image is printed on the recording medium. Further, since PWM processing exceeding 100% cannot be performed, the correction processing illustrated in FIG. 11B cannot be performed on a fine line formed by pixels having a pixel value of 16. Accordingly, an example of a case where the exposure for one pixel needs to be 100% or more will be described with reference to FIGS. 12 and 13. In this example, the image data is similar to the image data including a fine line image illustrated in FIG. 10, and the pixel value of the fine line pixels is 16. FIG. 12 illustrates data obtained as a result of the fine line processing unit 505 performing correction processing on quantized image data in which pixels having a pixel value of 16 form a fine line. The pixel value of the pixels in the center column of FIG. 12 is 16, and the pixels near the fine line pixels positioned either side of the center column each have a pixel value of 8. In other words, correction processing is performed so that the exposure width is increased by exposing the pixels near the pixels that are originally to form the fine line. FIG. 13 illustrates exposure signal data generated based on the image data illustrated in FIG. 12. Referring to FIG. 13, the center column is 100% exposed, and the columns on either side thereof are 50% exposed. It can be seen that the total of the exposure signal data forming the fine line indicates a thicker line than the line in the input fine line image. Although FIG. 13 illustrates, as a desirable example, a case where right or left justification is appropriately performed by PWM processing, simple center-justification may also be performed by the PWM processing.

Although an image including a fine line in the vertical direction has been described above as an example, the correction processing described with reference to FIGS. 12 and 13 can also be realized for an image including a fine line in a horizontal direction or in a diagonal direction. In addition, since the level of thinness of the fine line is different depending on the amplitude of the paper surface unevenness, it is desirable to appropriately determine the correction amount of the exposure signal data according to amplitude information, such as widening the area to be exposed as the amplitude increases. In the processing for thickening the line in step S904, the method for performing the correction is not limited to that described above. For example, a method for performing line thickening correction on an input image according to the frequency characteristic of the paper surface unevenness may be used.

Next, the processing performed in step S905 will be described with reference to FIGS. 14A and 14B. As described above, if the paper surface unevenness has a high frequency, and if printing is performed under the same conditions as those for smooth paper, the fine line pixel is printed with lower density than that originally intended for the fine line image. Accordingly, correction processing is performed on the quantized image data obtained from the quantization processing unit 504 so that the density of the fine line pixel is higher than that for smooth paper. This processing for increasing the density is processing for increasing the height of the toner image transferred onto the paper. For example, the density of the toner image (development toner image) to be developed is increased by increasing the intensity of the laser light to be emitted for exposure (hereinafter, "exposure intensity"), which enables the toner amount transferred onto paper having large surface unevenness to be at about the same level as that for smooth paper. However, in step S905, the fine line processing unit 505 does not perform processing on pixels with a pixel value of 0.

Figure 14A:
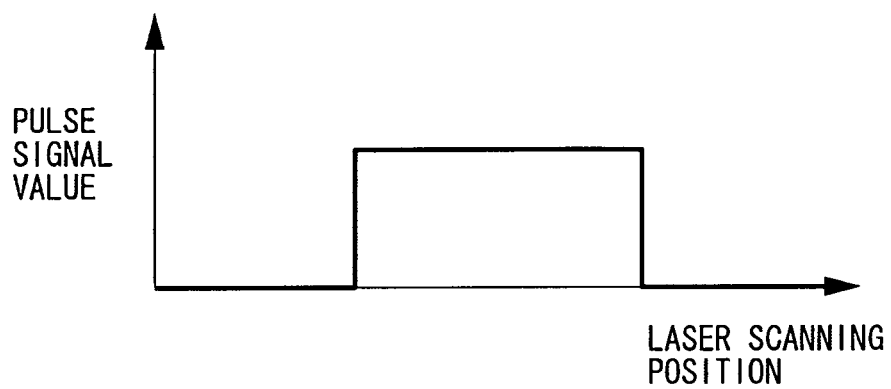
FIGS. 14A and 14B are schematic diagrams illustrating examples of exposure signal data in a case where pulse amplitude modulation processing is performed.
Figure 14B:
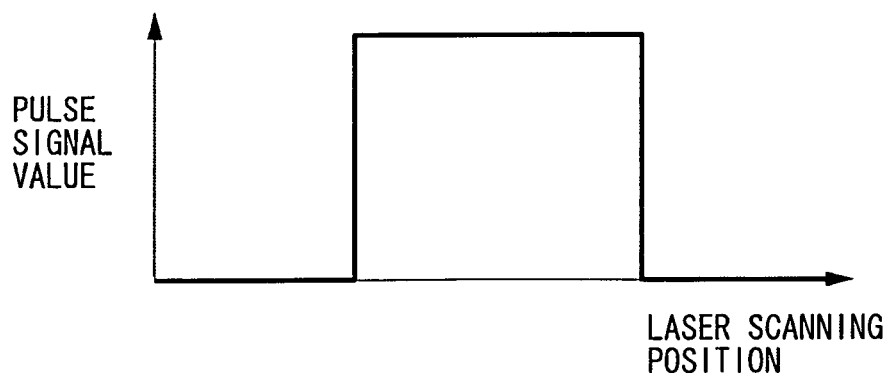

FIGS. 14A and 14B are examples of exposure signal data when pulse amplitude modulation processing (PAM processing), which is processing for changing this exposure intensity, has been performed. FIG. 14A illustrates exposure signal data (a pulse signal value) in the case of smooth paper where it is determined in step S902 that there is no need to perform correction processing. FIG. 14B illustrates exposure signal data in a case where the correction processing for high-frequency paper is performed in step S905. In FIG. 14B, the exposure intensity is a higher value than that in FIG. 14A. As described above, the toner image to be developed has a higher toner height than that for smooth paper, so that after the transfer process and the fixing process, a line having about the same density as the input fine line image is printed on the recording medium. The processing for increasing the amount of toner to be developed is not limited to PAM processing. For example, processing for increasing the developing bias may be performed. Since the level of decrease in the density of the fine line is different depending on the amplitude of the paper surface unevenness, it is desirable to appropriately determine the correction amount of toner to be developed according to amplitude information, such as increasing the exposure intensity or increasing the developing bias as the amplitude increases.

Further, although in the present exemplary embodiment, a configuration in which PWM processing is performed has been described as an example, the present invention is not limited to this.

By performing the above-described processing, deterioration in the quality of a fine line image can be suppressed when pieces of paper having different frequency characteristics of the surface unevenness are used.

In the first exemplary embodiment, the description has been given of processing for ensuring the reproducibility of a fine line for all pixels excluding pixels having a pixel value of 0 (step S904 or S905) in a case where the surface unevenness of the recording medium is rough. However, since the regions other than the fine line region are also subjected to the same processing, the halftone dot surface area may be enlarged or the halftone dot density may increase, which can lead to an increase in density for some input images.

Accordingly, in a second exemplary embodiment, an example will be described in which a fine line region in the input image is extracted, and fine line processing similar to that in the first exemplary embodiment is performed on only the fine line region.

Since the basic configuration and processing content are similar to those in the first exemplary embodiment, the following description will only be made about the parts that are different from the first exemplary embodiment, and a description of other parts will be omitted.

Figure 17:
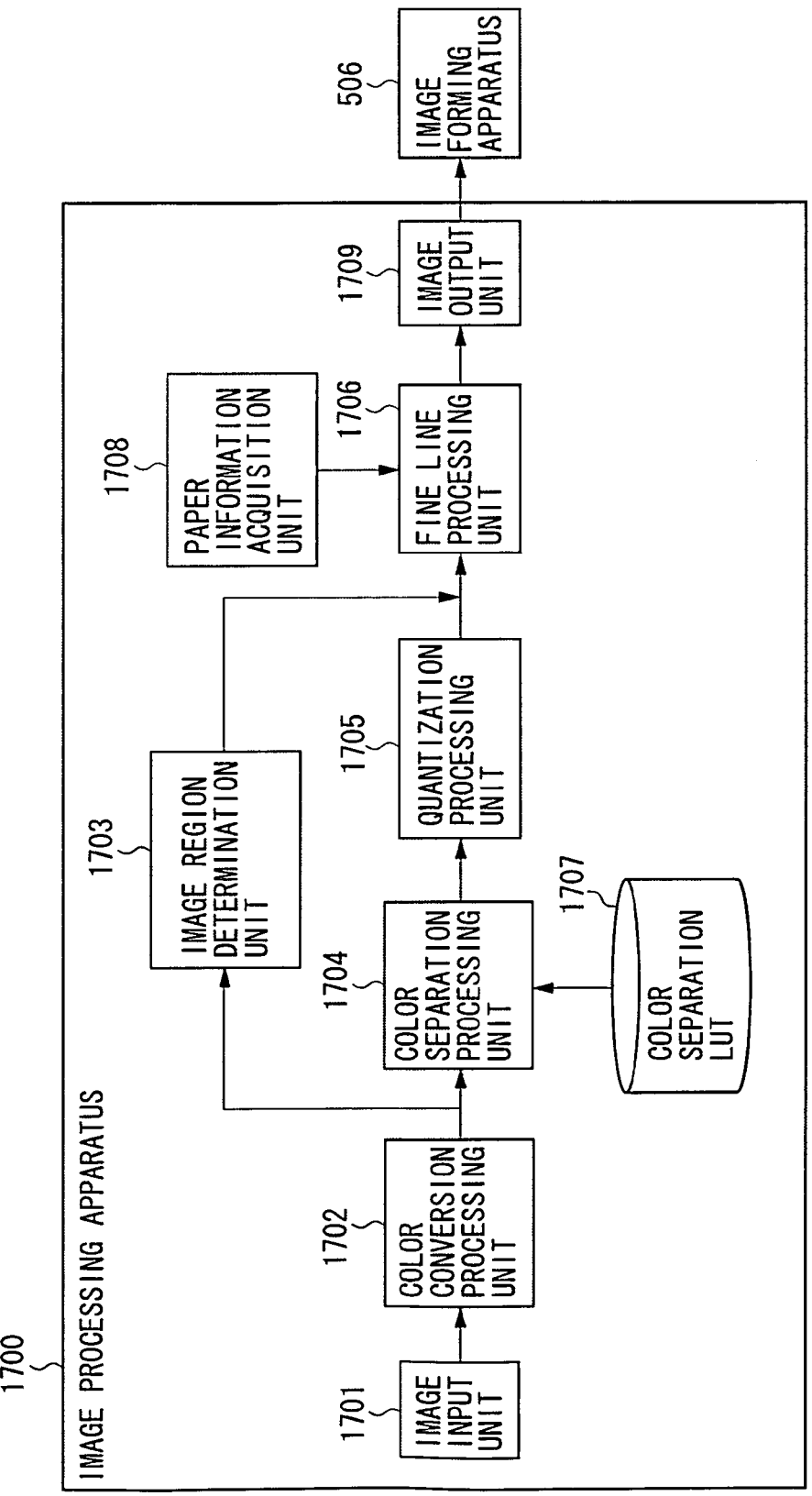
FIG. 17 is a block diagram illustrating a configuration of an image processing apparatus.

FIG. 17 is a block diagram illustrating a configuration of the electrophotographic image forming apparatus 506 to which the present exemplary embodiment can be applied.
[Image Processing Apparatus]

An image forming apparatus 1700 includes an image input unit 1701, a color conversion processing unit 1702, an image region determination unit 1703, a color separation processing unit 1704, a quantization processing unit 1705, a fine line processing unit 1706, a paper information acquisition unit 1708, and an image output unit 1709. Similar to the first exemplary embodiment, RGB input data to be printed by the image forming apparatus 506 is input via the image input unit 1701. The color conversion processing unit 1702 maps an image signal of the input image to a device-independent color space such as CIE L*a*b*.

The image region determination unit 1703 that is a particular feature of the present exemplary embodiment may use a commonly known method. The basic operation performed according to the present exemplary embodiment is to determine whether each pixel unit represents fine line information or some other objects, and to generate a signal for each object. A signal for indicating this determination result, for example, a value such as 1 for a fine line or 0 if not a fine line, is added to each pixel. By referring to this object signal, each of the below-described processing units can distinguish whether an arbitrary pixel position of the image is a fine line or not.

The color separation processing unit 1704 converts the device-independent color space values output by the color conversion processing unit 1702 into a signal value of each color material CMYK mounted in the image forming apparatus 506. The color separation processing unit 1704 converts L*a*b* values into the respective CMYK signal values by referring to a color separation LUT 1707 where the correspondence between L*a*b* values and CMYK values is described, and outputs color-separated image data corresponding to each color. The obtained color-separated image data of each color is, for example, 8-bit (256 tones) image data.

The quantization processing unit 1705 performs quantization processing on the color-separated image data of each color output from the color separation processing unit 1704. In the present exemplary embodiment, the quantization processing unit 1705 converts 8-bit (256 tones) color-separated image data into 4-bit (17 tones including 0 to 16 pixel values) quantized image data for each pixel.

The fine line processing unit 1706 acquires from the paper information acquisition unit 1708 paper information indicating a frequency characteristic of the paper to be output by the image forming apparatus 506, and performs fine line processing on the quantized image data of each color according to the frequency characteristic of the paper to be output. The fine line processing unit 1706 determines whether to perform fine line processing based on a signal which is generated by the image region determination unit 1703 and indicates whether a pixel represents fine line information or not. The fine line processing performed on the pixels determined to be a fine line is similar to that performed in the first exemplary embodiment. Processing is not performed on pixels determined to not be a fine line.

The image output unit 1709 converts the image data of each color output from the fine line processing unit 1706 into exposure signal data for controlling an exposure unit in the image forming apparatus 506. In the present exemplary embodiment, the image output unit 1709 performs PWM processing to translate image data including multiple tones into an exposure scanning length. In the present exemplary embodiment, the description has been given of a case where the image region determination unit 1703 performs determination processing on the data mapped by the color conversion processing unit 1702 to a device-independent color space such as CIE L*a*b*. However, the determination processing is not limited thereto. For example, the processing may be performed on input image data such as RGB input data, or may be performed on CMYK data processed by the color separation processing unit 1704.

Figure 18:
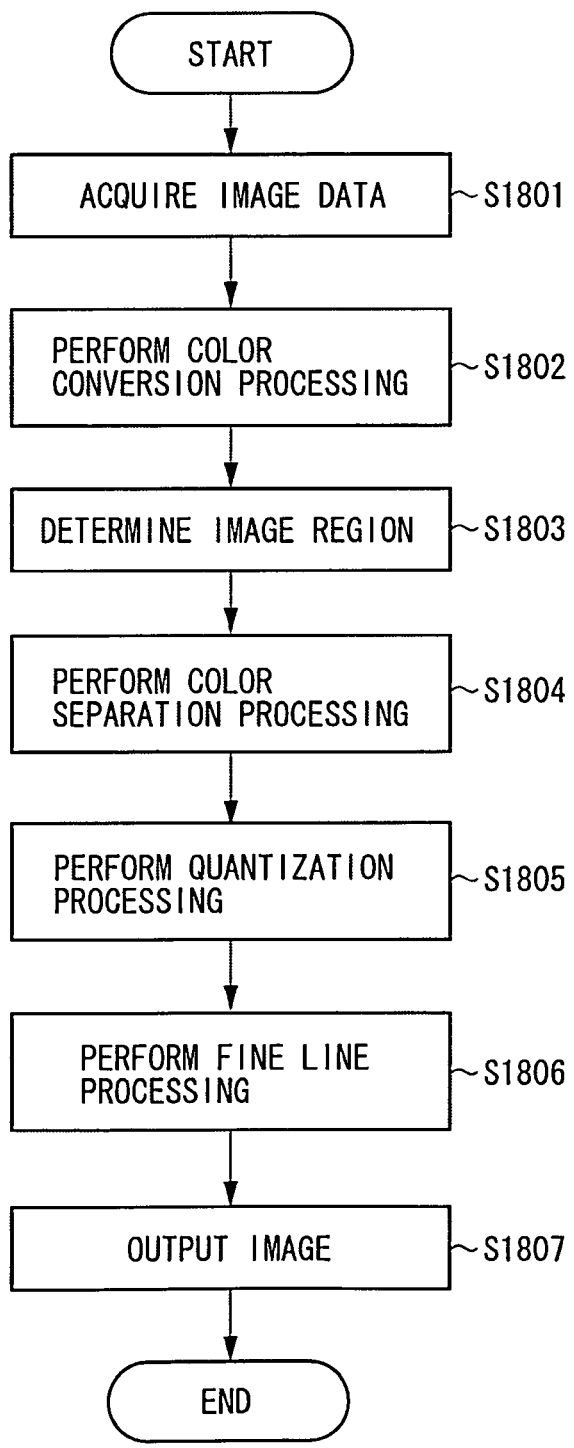
FIG. 18 is a flowchart illustrating a flow of processing performed in an image processing apparatus.

FIG. 18 is a flowchart illustrating a flow of processing performed in an image forming system to which the present exemplary embodiment can be applied. First, in step S1801, the image input unit 1701 acquires image data, and stores the image data in a memory region that has been secured according to the image data size. Next, in step S1802, the color conversion processing unit 1702 maps an image signal of the input image acquired in step S1801 to a device-independent color space, and updates the data in the memory region. In step S1803, the image region determination unit 1703 determines whether each pixel unit in the device-independent data converted in step S1803 represents fine line information or some other objects, and if the data represents a fine line, adds a signal of a value 1 to each pixel, and if the data does not represent a fine line, adds a signal of a value 0 to the pixels.

In step S1804, the color separation processing unit 1704 converts the device-independent data converted in step S1803 into a signal value corresponding to the recorded amount of each color material, and updates the data in the memory region. In addition, in step S1805, the quantization processing unit 1705 performs quantization processing on the signal value of each of the color materials subjected to the color separation processing in step S1804, and updates the data in the memory region. In step S1806, the fine line processing unit 1706 performs the above-described fine line processing on the quantized data, and updates the data in the memory region. Lastly, in step S1807, the image output unit 1709 performs PWM processing on the data subjected to the fine line processing, and transmits the resultant data to the image forming apparatus 506. Although an example has been described here in which the memory content is updated at each step, the data may also be stored in a different memory region secured for each processing step.

Figure 19:
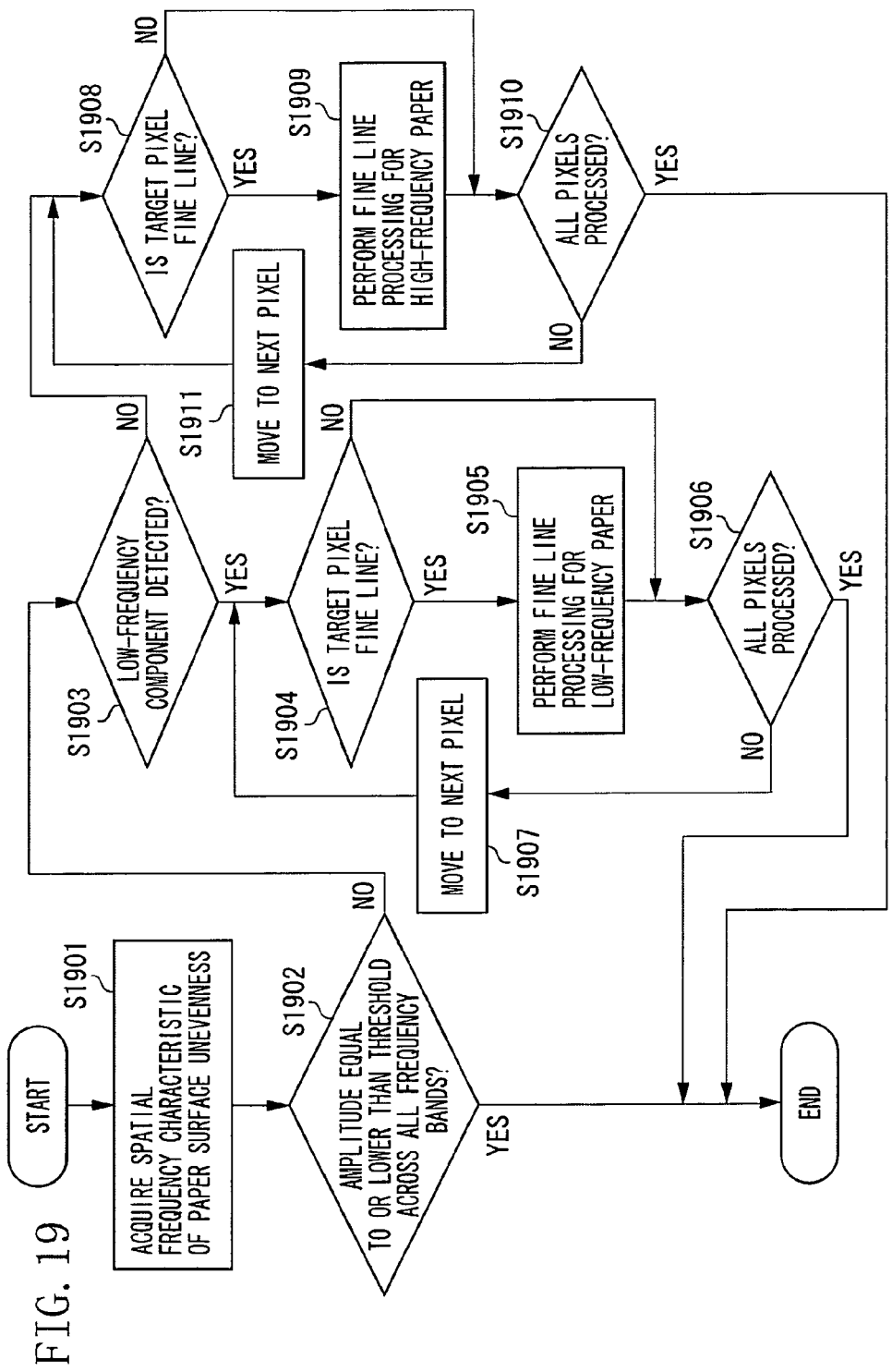
FIG. 19 is a flowchart illustrating a flow of processing for determining a fine line processing method.

FIG. 19 is a flowchart illustrating the fine line processing performed in step S1806 in detail.

First, in step S1901, the frequency characteristic of the surface unevenness of the paper to be output is acquired in a similar manner to that in the first exemplary embodiment. Next, in step S1902, it is determined whether the amplitude is equal to or less than a predetermined threshold at all target frequencies, namely, whether surface roughness is equal to or less than a predetermined value. If it is determined in step S1902 that the amplitude for the paper to be output is equal to or less than the predetermined threshold at all frequencies, namely, that the paper has a smooth surface (YES in step S1902), since there is no need to perform correction processing, correction processing is completed. On the other hand, if it is determined in step S1902 that the amplitude is greater than the predetermined threshold at any one of the frequencies, namely, when paper having a rough surface is used (NO in step S1902), there is a need to perform correction processing. The threshold used in step S1902 does not have to be a fixed value for all frequencies, a different threshold may be set for respective frequency bands. If it is determined in step S1902 that there is a need to perform correction processing (NO in step S1902), the processing proceeds to step S1903.

In step S1903, it is determined whether an amplitude component higher than a predetermined threshold is present in a frequency band lower than a predetermined frequency set in advance. If it is determined in step S1903 that a high amplitude component is present in the low-frequency band (YES in step S1903), the processing proceeds to step S1904, and determination processing is performed to determine whether a pixel unit is a fine line. If it is determined in step S1904 that the target pixel is fine line (YES in step S1904), the processing proceeds to step S1905, and fine line processing for low-frequency paper is performed. On the other hand, if it is determined in step S1904 that the target pixel is not fine line (NO in step S1904), fine line processing is not performed, and the processing proceeds to step S1906. In step S1906, it is determined whether all pixels have been processed. If it is determined that processing has not finished (NO in step S1906), in step S1907, the processing moves to the next pixel. Then, the processing returns to step S1904, and the processing is subsequently repeated in a similar manner. If it is determined in step S1906 that all pixels have been processed, the fine line processing is completed.

If it is determined in step S1903 that a high amplitude component is not present in the low-frequency band, namely, if it is determined that a high amplitude component is present on the high-frequency band side (NO in step S1903), the processing proceeds to step S1908, and determination processing is performed in to determine whether pixel unit is a fine line. If it is determined in step S1908 that the target pixel is fine line (YES in step S1908), the processing proceeds to step S1909, and fine line processing for high-frequency paper is performed. On the other hand, if it is determined in step S1908 that the target pixel is not fine line (NO in step S1908), fine line processing is not performed, and the processing proceeds to step S1910. In step S1910, it is determined whether all pixels have been processed. If it is determined that processing has not finished (NO in step S1910), in step S1911, the processing moves to the next pixel. Then, the processing returns to step S1908, and the processing is subsequently repeated in a similar manner. If it is determined in step S1910 that all the pixels have been processed, the fine line processing is completed.

Since the fine line processing for low-frequency paper in step S1905 and the fine line processing for high-frequency paper in step S1909, and processing performed in a case where fine line processing is not performed are similar to those in the first exemplary embodiment, a detailed description thereof will be omitted here.

By performing the above-described processing, fluctuations in image density can be suppressed while suppressing deterioration in the quality of a fine line image when pieces of paper having different frequency characteristics of the surface unevenness are used.

Although the description has been given of processing for thickening a fine line when forming an image on paper whose surface unevenness has a low-frequency frequency characteristic, depending on the used paper, there can be anisotropy in the fiber direction of the paper (surface unevenness). Especially in a quantized fine line image, the toner region to be developed can be widened in both a vertical direction and a horizontal direction, the magnitude of the thickening effect is different depending on the combination with the anisotropy of the paper surface unevenness. Accordingly, a more desirable processing method when utilizing paper having large surface unevenness anisotropy will now be described as a modified example.

In step S901 of FIG. 9, anisotropy information about the paper surface unevenness is also acquired simultaneously with acquiring the frequency characteristic of the paper surface unevenness. For example, using the unevenness sensor unit illustrated in FIGS. 7A and 7B, the paper to be used is scanned in both the vertical direction and the horizontal direction, and the surface unevenness in the vertical direction and the surface unevenness in the horizontal direction are acquired. Alternatively, a method utilizing a two-dimensional sensor or a surface profile measurement device, or a method in which the user inputs the paper unevenness information, which are alternative surface unevenness acquisition methods described in the first exemplary embodiment, may be employed.

Next, in step S903, if a low-frequency component is detected, it is determined which of the amplitude in the vertical direction and the amplitude in the horizontal direction is higher. If the amplitude in the vertical direction is higher than the amplitude in the horizontal direction, the development toner region is widened in the vertical direction, and if the amplitude in the horizontal direction is higher than the amplitude in the vertical direction, the development toner region is widened in the horizontal direction.

Figure 15B:
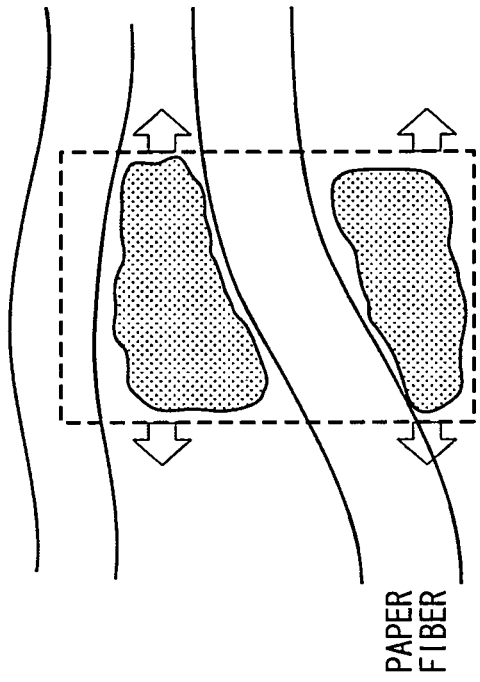
FIGS. 15A and 15B illustrate anisotropy in the surface unevenness of paper.
Figure 15A:
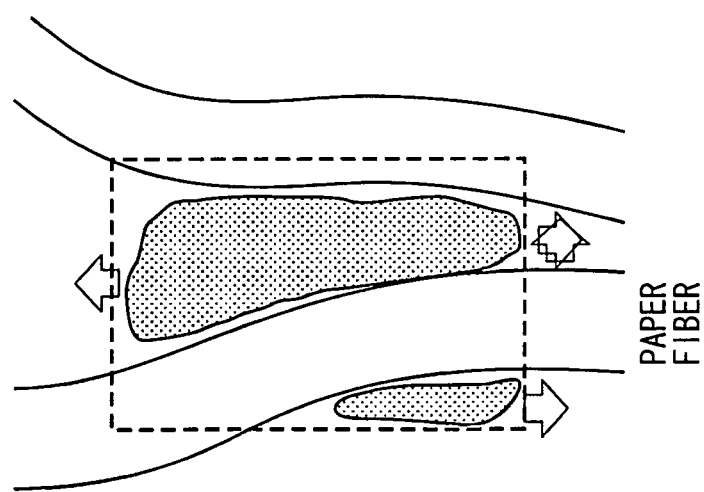

FIGS. 15A and 15B are schematic diagrams illustrating the direction in which a development toner region is widened when there is anisotropy in the surface unevenness of paper.

FIG. 15A illustrates a case where paper has a lot of fibers in the vertical direction, namely, the amplitude in the vertical direction is higher than the amplitude in the horizontal direction. Since the toner is depleted or wiped together by the paper fibers on the paper during the transfer process and the fixing process even if the development toner region is widened in the horizontal direction, the coating ratio on the paper can be improved more efficiently by widening the region in the vertical direction. Similarly, FIG. 15B illustrates a case where paper has a lot of fibers in the horizontal direction, namely, the amplitude in the horizontal direction is higher than the amplitude in the vertical direction. Since the toner is depleted or wiped away by the paper fibers on the paper during the transfer process and the fixing process even if the development toner region is widened in the vertical direction, the coating ratio on the paper can be improved more efficiently by widening the region in the horizontal direction.

The method for widening the development toner region can utilize the method described in the first exemplary embodiment.

Exemplary embodiments of the present invention can be achieved by supplying a storage medium storing a program code of software for realizing the functions of the above exemplary embodiments to a system or an information processing apparatus, and causing a computer (or a central processing unit (CPU) or a micro processing unit (MPU)) of the system or the information processing apparatus to read and execute the program code. In this case, the program code read from the storage medium realizes the functions of the above exemplary embodiments, so that a computer-readable storage medium storing the program code constitutes the present invention.

Examples of computer-readable storage media which can be used for supplying such a program code include a hard disk, an optical disc, a magneto-optical disk, a compact disc-read-only memory (CD-ROM), a magnetic tape, a nonvolatile memory card, a ROM, and a digital versatile disc (DVD).

Further, the functions of the above exemplary embodiments are realized by executing a computer program code read by a computer. The present invention also includes cases where, based on an instruction from the program code, an operating system (OS) or the like running on the computer performs part or all of the actual processing, and by that processing the functions of the above-described exemplary embodiments are realized.

Further, the present invention also includes cases where the program code read from the storage medium is written into a memory provided on a function expansion board inserted into the computer or a function expansion unit connected to the computer, and then executed based on an instruction from the computer program code. In this case, a CPU or the like provided on the function expansion board or function expansion unit performs part or all of the actual processing, and by that processing the respective functions of the above exemplary embodiments are realized.

Thus, as described above, according to exemplary embodiments of the present invention, deterioration in the quality of a fine line image can be suppressed when paper having different types of surface unevenness is used.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-099447 filed May 9, 2013, and No. 2014-082022 filed Apr. 11, 2014, which are hereby incorporated by reference herein in their entirety.

What is claimed is:

1. An image processing apparatus comprising:
an input unit configured to input image data representing an image to be formed on a recording medium;
an acquisition unit configured to acquire information related to a degree of surface unevenness of the recording medium caused by fibers of the recording medium; and
a correction unit configured to correct the image data based on the information related to the degree of surface unevenness acquired by the acquisition unit,
wherein the acquisition unit is configured to acquire, as the information related to the degree of surface unevenness of the recording medium, a frequency characteristic of surface unevenness to be obtained by performing frequency analysis on a change in an intensity when light emitted to and reflected from the recording medium is received while the recording medium is conveyed, and
wherein the correction unit is configured to thicken a fine line in the image data if an amplitude component in a frequency band whose frequency characteristic of the surface unevenness is lower than a predetermined frequency is higher than a predetermined value, and increase a density of a fine line in the image data if an amplitude component in a frequency band whose frequency characteristic of the surface unevenness is higher than a predetermined frequency is higher than a predetermined value.

2. The image processing apparatus according to claim 1, wherein the correction unit is configured to thicken a fine line in the image data if an amplitude component in a frequency band whose frequency characteristic of the surface unevenness is lower than a predetermined frequency is higher than a predetermined value.

3. The image processing apparatus according to claim 2, wherein the correction unit is configured to determine an amount for thickening the fine line based on the amplitude component of the surface unevenness.

4. The image processing apparatus according to claim 1, wherein the correction unit is configured to increase a density of a fine line in the image data if an amplitude component in a frequency band whose frequency characteristic of the surface unevenness is higher than a predetermined frequency is higher than a predetermined value.

5. The image processing apparatus according to claim 4, wherein the correction unit is configured to determine an amount for increasing the density of the fine line based on the amplitude component of the surface unevenness.

6. The image processing apparatus according to claim 5, wherein the correction unit is configured to increase an exposure intensity by pulse amplitude modulation processing, or to increase developing bias.

7. The image processing apparatus according to claim 1, wherein the correction unit is configured to change pixel values of pixels forming the image data.

8. The image processing apparatus according to claim 1, further comprising a detection unit configured to detect pixels forming a fine line in the image data,
wherein the correction unit is configured to correct only pixels detected by the detection unit as pixels forming the fine line or pixels in a vicinity thereof.

9. The image processing apparatus according to claim 1, wherein the correction unit is configured to increase an exposure width represented by exposure signal data corresponding to the pixels detected by the detection unit as pixels forming the fine line if an amplitude component in a frequency band whose frequency characteristic of the surface unevenness is lower than a predetermined frequency is higher than a predetermined value.

10. The image processing apparatus according to claim 1, wherein the correction unit is configured to correct the image data based on whether a fiber direction of the recording medium is a vertical direction or a horizontal direction.

11. The image processing apparatus according to claim 1, further comprising a detection unit configured to detect a fine line in the image data,
wherein the correction unit is configured to correct pixels detected by the detection unit as pixels forming the fine line.

12. A non-transitory computer-readable storage medium storing a program that causes a computer to function as the image processing apparatus according to claim 1 by causing the computer to read and execute the program.

13. An image processing method comprising:
inputting image data representing an image to be formed on a recording medium;
acquiring information related to a degree of surface unevenness of the recording medium caused by fibers of the recording medium; and
correcting the image data based on the acquired information related to the degree of surface unevenness,
wherein acquiring information related to the degree of surface unevenness of the recording medium comprises acquiring a frequency characteristic of surface unevenness to be obtained by performing frequency analysis on a change in an intensity when light emitted to and reflected from the recording medium is received while the recording medium is conveyed, and
wherein correcting the image data comprises thickening a fine line in the image data if an amplitude component in a frequency band whose frequency characteristic of the surface unevenness is lower than a predetermined frequency is higher than a predetermined value, and increasing a density of a fine line in the image data if an amplitude component in a frequency band whose frequency characteristic of the surface unevenness is higher than a predetermined frequency is higher than a predetermined value.

14. An image processing apparatus comprising:
an input unit configured to input image data representing an image to be formed on a recording medium;
an acquisition unit configured to acquire information related to a degree of surface unevenness of the recording medium caused by fibers of the recording medium; and
a correction unit configured to correct the image data based on the information related to the degree of surface unevenness acquired by the acquisition unit,
wherein the acquisition unit is configured to acquire, as the information related to the degree of surface unevenness of the recording medium, a frequency characteristic of surface unevenness to be obtained by performing frequency analysis on a change in an intensity when light emitted to and reflected from the recording medium is received while the recording medium is conveyed, and
wherein the correction unit is configured to not correct a fine line if an amplitude component in an entire frequency band is equal to or lower than a first threshold value, to detect an amplitude component in a frequency band lower than a predetermined frequency if the amplitude component in the entire frequency band is higher than a predetermined threshold value, to thicken a fine line in the image data if an amplitude component higher than a second threshold value is detected in a frequency band lower than the predetermined frequency, and to increase a density of a fine line in the image data if the amplitude component higher than the second threshold value is not detected in the frequency band lower than the predetermined frequency.

* * * * *